June 23, 1942. J. V. LUCK 2,287,260
SURGICAL INSTRUMENT
Filed Aug. 20, 1940 2 Sheets-Sheet 1

Inventor
J. Vernon Luck
By Lyon & Lyon
Attorneys

June 23, 1942.  J. V. LUCK  2,287,260
SURGICAL INSTRUMENT
Filed Aug. 20, 1940  2 Sheets-Sheet 2
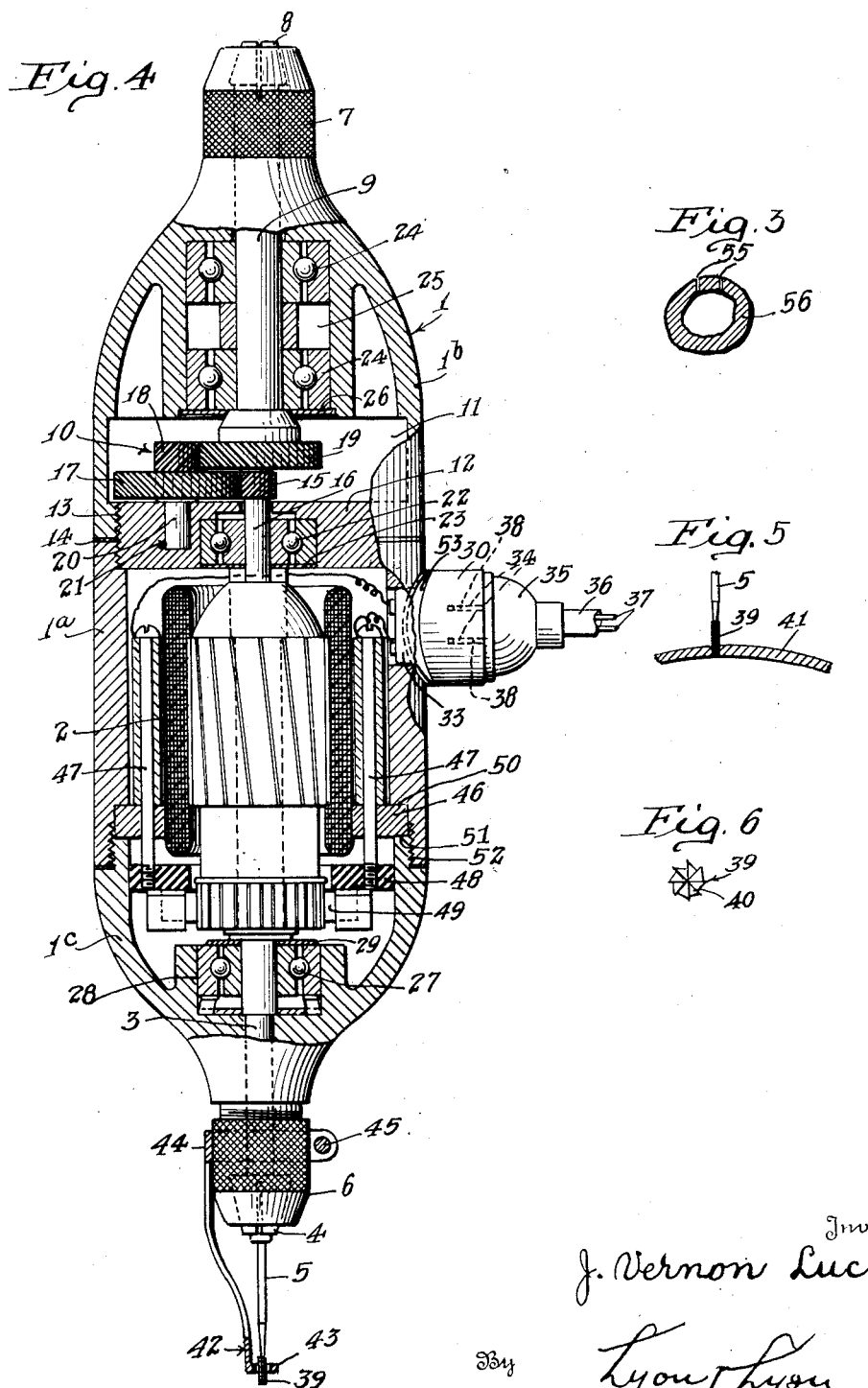
Inventor
J. Vernon Luck
By Lyon & Lyon
Attorneys Patented June 23, 1942

2,287,260

UNITED STATES PATENT OFFICE 2,287,260

SURGICAL INSTRUMENT

James Vernon Luck, Los Angeles, Calif.

Application August 20, 1940, Serial No. 353,328

4 Claims. (Cl. 172—36)

This invention relates to a surgical tool holder and surgical method.

The improvements relate particularly to a type of holder in which an electric motor is carried within the casing of the holder, the holder being provided with a chuck for carrying a rotary cutter. The tool holder to which my improvement relates, has a body or casing of substantially cylindrical or shell-form, that is provided with a chuck at each end, one chuck being driven at a relatively high speed and the other at a relatively low speed, to enable the chuck to be used while employing bone cutting tools of different character.

The principal object of the invention is to provide the body of this tool holder with features of construction which will enable the tool holder to be firmly and positively held in the surgeon's hand, and with equal facility, regardless of which end of the tool holder is being employed for holding the tool that is being used in the surgical operation.

A further object of the invention is to provide a construction for this tool holder, which will facilitate its being heated to high temperature to sterilize the entire tool holder without necessitating taking the holder apart.

In conducting surgical operations, it is sometimes necessary to form what is known as a "bone graft" and in conducting this operation a tongue or elongated piece is cut out by longitudinal slots formed longitudinally in a long bone of the body from which the graft is to be removed. In doing this, parallel cuts are formed in the bone that pass completely through the wall of the bone to its central canal, and it is now the present practice to remove this piece or tongue by employing a chisel to cut across the tongue of bone at each end bridging the space between the ends of the two parallel slots. The blows that it is necessary to give the chisel, constitute a severe shock to the patient. One of the objects of the present invention is to provide improved means for removing such a bone graft or tongue from the bone of the patient.

Heretofore it has been attempted to employ a rotary tool resembling a drill or router, for cutting bone, but the tool employed for this purpose, I am informed, was approximately one-eighth inch in diameter. With a tool of that diameter it is impossible to perform many of the surgical operations that have become necessary in the practice of modern surgery; for example, in performing laminectomies. In conducting this operation, the interspinous and supraspinous ligaments are kept intact, the laminae being sectioned on each side of the spinous processes, using a burr rotating at a high speed. By elevating and retracting the mobilized spines, the spinal cord can be readily explored. In the present practice, the cutting tools used for this purpose, destroy so much of the spines that portions of the laminae that are removed, must be discarded.

One of the objects of the present invention is to provide a surgical instrument and method of operation, which will enable such an operation to be conducted without destroying any substantial part of the spines, and in such a way that when the exploration is concluded, the spines may be set back in their original position.

Further objects of the invention will appear hereinafter.

The invention consists in the novel parts and combination of parts to be described hereinafter, all of which contribute to produce an efficient surgical instrument.

A preferred embodiment of the invention is described in the following specification, while the broad scope of the invention is pointed out in the appended claims.

In the drawings:

Fig. 3 is a cross-section of a diagrammatic nature, through a long bone such as that illustrated in Fig. 2, which is being cut to form a graft.

Fig. 4 is substantially a longitudinal vertical section through the tool holder, certain parts, however, being illustrated in elevation through the agency of broken lines across the view.

Fig. 5 is a diagrammatic section indicating a portion of the cranium, and illustrating how the cutting tool is applied to the same in making a cut.

Fig. 6 is a bottom plan view of the cutter tool illustrated in Figs. 4 and 5, but upon an enlarged scale.

Figure 1:
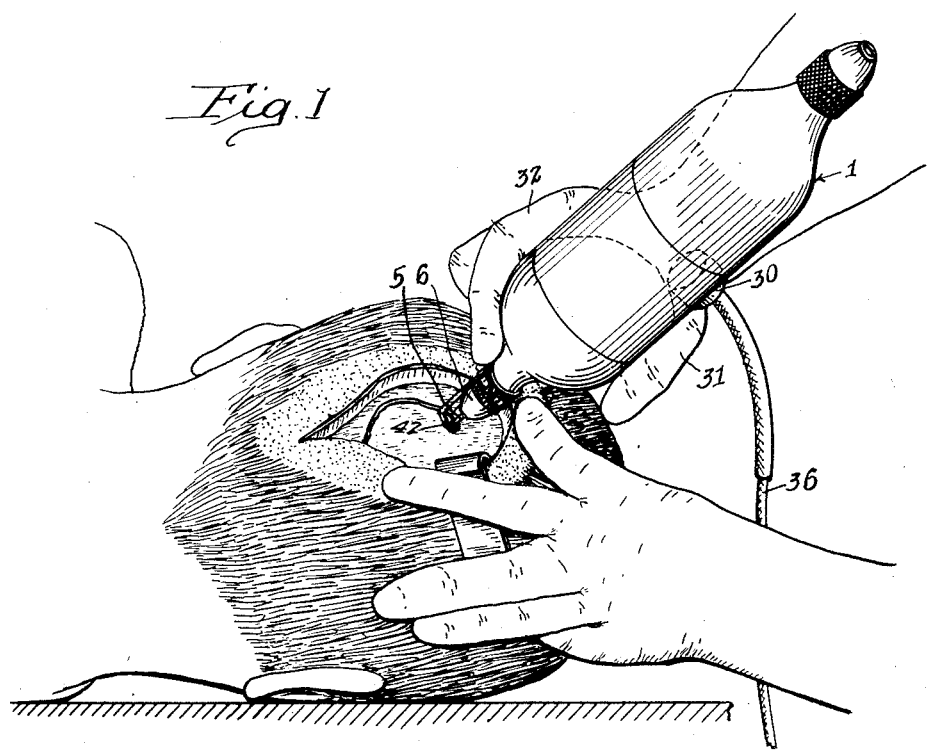
Fig. 1 is a perspective illustrating the manner in which this tool is used in performing a trepanning operation, and particularly illustrating the way in which the tool holder facilitates the firm grasping of the tool holder in the surgeon's hand.

In practicing the invention, I provide a tool holder 1, which is preferably of cylindrical form, that is to say, it consists of a shell-form casing (see Fig. 4). This casing is preferably formed of three sections: a main section 1a, a relatively long end section 1b, and a relatively short end section 1c. These sections are detachably secured together by means of threads as indicated, and as will be described more particularly hereinafter. The section 1a may be considered as the main section, as it is a mid-section and carries within it the electric motor 2 that drives the tool inserted in a chuck at either end of the tool holder.

As illustrated in Fig. 4, the motor shaft has an extension 3 at its lower end, which extends downwardly and carries a chuck 4, the jaws of which can clamp the tang of a rotary cutting tool 5. The chuck includes a clamping sleeve 6 or any other suitable means for closing the chuck on the tool. The end section 1c of the casing tapers down to a diameter approximating that of the sleeve 6. This construction, of course, results in driving the tool 5 at the same rotary speed as the rotor of the motor 2.

The section 1b has a form similar to section 1c, and tapers down to a point adjacent a sleeve 7 similar to the sleeve 6 for operating a chuck 8 at the other end of the tool handle. This chuck 8, however, is not directly connected to the motor shaft, but is carried on its own shaft 9 that is driven through reduction gearing indicated generally by the reference numeral 10, which is housed in a reduction gear chamber 11 formed in the shell or section 1b. In the present instance, between the section 1b and the main section 1a, I provide a relatively thick dividing wall or partition wall 12, which has threads 13 on its exterior surface, which enable the threaded ends of the sections 1a and 1b to be screwed onto this dividing wall. If desired, a gasket 14 may be placed between the abutting end faces of these two sections.

The reduction gearing includes a pinion 15 carried on the end of the motor shaft 16 meshing with a large gear 17 that is rigidly connected to a pinion 18, and this pinion meshes with a large gear 19 on the end of the shaft 9. The gear 17 and pinion 18 are rigid on a stub shaft 20 that is mounted in a bore or bearing 21 extending into the dividing wall 12 from one side, but not extending through the same. In the dividing wall 12 a suitable ball bearing 22 is provided which, on the motor side of the wall, is provided with an oil-tight cap or disc 23. The shaft 9 is provided with a pair of ball bearings 24 which are received in the cylindrical bearing chamber 25 opening into the chamber 11, and the ball bearing that is adjacent to the chamber 11, is sealed in by means of a disc or cap 26 which is oil-tight. At the other end of the tool handle a ball bearing 27 is provided, received in a bearing socket 28 that opens into the interior of the section 1c, and the inner end of this bearing is closed by a suitable oil-tight seal or disc 29.

In order to enable the tool handle to be grasped securely and with equal facility when using either end of the tool handle to drive the surgical tool, I provide the mid-section 1a with an outwardly projecting extension 30, and in using the tool this extension 30 fits into the angle between the operator's thumb 31 and forefinger 32, as indicated in Fig. 1. This projection or extension 30 gives a firm support for the weight of the tool handle in the surgeon's hand. In other words, it imparts the weight of the tool to the hand, while the tapered form of the lower section (at the moment) of the casing, enables the fingers of the hand and the thumb to be clasped around the same. In this way the tool may be very securely held in spite of the fact that it necessarily has considerable weight.

The extension 30, located as it is, at about the middle of the tool handle, gives a desirable balancing effect in using the tool to perform a surgical operation. Furthermore, by reason of the fact that it is located at substantially the middle point on the length of the tool handle, it enables both ends of the tool handle to be used with equal facility for holding and operating the tool.

This extension 30 is preferably of cylindrical form and operates as a housing for an electric socket 33 connected up by wires at its inner end to the motor 2, and provided with twin sockets 34 on its outer face for the attachment of an electric plug 35 carrying an electric cord 36, the circuit wires 37 of which attach respectively to the two contacts 38 carried by the plug 35. The motor should run at a speed of from 10,000 to 15,000 R. P. M., as this speed is necessary in order to enable this tool of very small diameter to be employed in the surgical operations, and it is necessary to employ a tool of small diameter in order to prevent destruction of too much of the bony structure. In practice, it is possible with a speed of 15,000 R. P. M. to employ a tool such as the tool 5, in which the burr 39 of the tool will have a diameter as small as $\frac{1}{32}$ of an inch. This tool is preferably formed on its lower end with cutter teeth 40 as indicated in Fig. 6, and is formed on its sides with longitudinally extending teeth for cutting on the sides of the tool. This enables the tool to be used as a drill to pass into bony structures such as the cranium bone 41 (see Fig. 5). This tool handle and high speed rotary tool can be very advantageously employed for performing a trepanning operation such as illustrated in Fig. 1. In conducting such an operation, it is desirable to employ a guard 42 such as indicated in Fig. 4, for limiting the penetration of the tool through the cranium. This guard has an annular head 43 with an opening through it, in which the tool rotates, and this head lies quite near the tip of the burr 39. In practice, of course, the outer side of the ring or head 43 will lie against the outer surface of the bone and limit the degree of penetration of the burr.

This guard 42 can be formed as an arm extending from a split ring 44 that can be clamped on the clutch sleeve 6 by means of a clamping bolt 45. This split ring 44 evidently will enable the position of the head 43 to be adjusted nicely with respect to the tip of the burr 39.

Referring again to the construction of the motor 2, it should be stated that the motor is preferably constructed with a carrier ring 46 through which long bolts 47 pass, said long bolts carrying an insulator ring 48 which carries the insulated brushes 49, which are in electrical contact with the long bolts. In practice, all the wire windings in the motor have glass insulation or similar insulation which is impervious to heat. The bearing chambers for the bearings are all packed with suitable lubricant which is sealed in so that these bearings need not have any attention.

The carrier ring 46 for the motor, may be clamped between the shoulders 50 and 51 when the mid-section 1a and the end section 1c are screwed together at their threaded connection 52.

The socket housing 30 is formed as a separate piece, and provided with an integral saddle 53 that can be welded to the exterior of the section 1a or else secured by machine screws. The shell is, of course, provided with an opening as illustrated, into which the insulated electric socket 33 fits.

Figure 2:
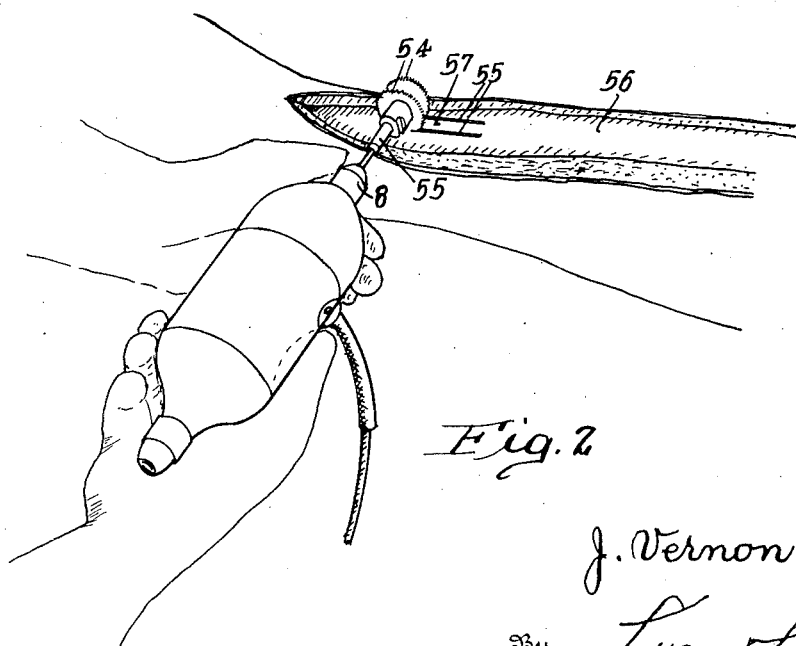
Fig. 2 is a perspective view illustrating the tool holder being used for cutting a bone graft longitudinally from the long bone of the body.

The chuck 8 is preferably driven at a 1 to 10 ratio from the shaft 16. This speed adapts it admirably for use with a twin saw 54 (see Fig. 2), said twin saw consisting of two saw discs carried on a common hub rigidly carried on a spindle 55 that can be secured in the chuck 8. With this speed reduction the periphery of the saw discs will be moving at a practicable speed for cutting parallel channels 55 in a long bone 56 of the leg, for example, to cut out a graft 57 for a grafting operation. Fig. 3 indicates diagrammatically the section through the long bone 56 at this point. In conducting such an operation, the saws will cut the channels 55 completely through the wall of the bone. A tool such as the tool 5, and rotating at the high speed of 10,000 or 15,000 R. P. M., would be used for cutting across the ends of the graft 57 between the channels 55 so as to enable the grafting piece 57 to be removed.

In practice, the casing 1 is substantially liquid-tight so that the entire hand tool can withstand the heat of autoclave sterilization. The only real openings into the casing are at the ends where the chucks are mounted, and at these openings any suitable adequate protection to prevent moisture from entering the casing, would be provided. However, if any moisture should enter the casing, it could not pass the oily lubricating pack in the bearing chambers between the chucks and the motor.

Furthermore, the chamber 11 is also packed with an oily lubricant. By reason of the fact that there are no real openings from the casing, there is no danger of any sparks from the brushes in the motor exploding an anaesthetic gas. In practice, a foot switch of the mercury type would be employed to complete the equipment, as this is the safest type of switch that can be used with such an apparatus in the proximity of an explosive gas, such as some anaesthetic gases.

The high speed rotary tool of small diameter, such as 1/32 of an inch or thereabout, is extremely useful in surgery for cutting bone grafts of irregular and curving contour, as this tool can readily cut an irregular shape which would be impossible with a saw. The direction of the cut in the bone evidently may be changed as frequently and as acutely as the case requires. If desired, a pattern or guide may be used to facilitate accurate cutting of a graft. This small high speed tool is also extremely useful in surgery for making the transverse end cuts such as described above in connection with the graft 57 illustrated in Fig. 2. It is now common practice to make such end cuts with an osteotome or chisel, which less rarely than is generally appreciated, fractures the host bone.

The high speed rotating tool is also most useful in removal of cortical windows in acute osteomyelitis. Such procedure may be accomplished much more easily with this high speed rotating tool than with a chisel, which is now used in common practice; and avoids the danger of shock to the patient, such as is experienced when the blow is imparted to the chisel. At such times these patients are frequently so acutely ill that it is most important that they be spared any shock incident to the use of a chisel. The high speed tool also is extremely useful in cutting bone grafts and bone flaps from the ilium for arthrodesis procedures and hip shelving operations.

In laminectomies, the small diameter high speed tool has very marked advantages over a saw such as is now used in common practice. The use of the guard 42 at such a time, is advisable to protect the meninges and spinal cord. By elevating and retracting the mobilized spines, the spinal cord can be readily explored. When the exploration is concluded, the spines may be set back in their original position, and the laminal osteotomies expected to unite. In other words, the pieces of bone removed for the operation, are not destroyed as they would be in the usual operation with a rongeur, and by reason of the fact that so little bony structure is actually removed with this small diameter tool, the pieces removed can be set back almost in their normal position where they will unite to the body of the bone from which they were removed.

Many other embodiments of the invention may be resorted to without departing from the spirit of the invention.

What I claim is:

1. In a surgical instrument, a tool handle having an elongated shell-form casing to be grasped in the surgeon's hand, an electric motor mounted coaxially within the casing, a chuck at one end of the casing having a shaft in alignment with the axis of the motor and directly connected to the same, a chuck coaxially mounted on the other end of the casing, with a driving shaft extending into the casing in alignment with the motor-shaft, reduction gearing for driving the last-named shaft from the motor, and a flexible connection including an electric cord carrying circuit wires connected to the casing at substantially the middle point thereof so as to leave the surface of the casing between the chucks and the flexible connection, free to be grasped by the surgeon in using the instrument.

2. In a surgical instrument, a tool handle having an elongated shell-form casing to be grasped in the surgeon's hand, including a middle section of substantially cylindrical form and an end section at one end secured to the same and tapering toward its end, another end section for the casing removably secured to the other end of the middle section, said end sections being of substantially the same diameter as the middle section; said second-named end section being also tapered and enabling the casing to be grasped with the same facility in applying either end to the surgical work; a chuck carried by each end section for carrying a rotary cutting tool, an electric motor carried in the middle section with its axis coaxial with the said casing, a direct connection from the motor shaft to the chuck carried by the first-named end section, and reduction gearing carried in the other end section for driving the adjacent chuck at reduced speed from the motor.

3. In a surgical instrument, a tool handle having an elongated shell-form casing to be grasped in the surgeon's hand, having a middle section of substantially cylindrical form and having an end section at one end removably secured to the same and tapering toward its end, an end section for the casing removably secured to the other end of said middle section, said end sections being of substantially the same diameter as the middle section; said second-named end section being also tapered so that the ends of said casing are substantially alike in contour and dimension, and enabling the casing to be grasped with the same facility in applying either end to the surgical work; a chuck carried by each end section for carrying a rotary cutting tool, an electric motor carried in the middle section with its axis coaxial with the said casing, a direct connection from the motor shaft to the chuck carried by the first-named end section, and reduction gearing carried in the other end section for driving the adjacent chuck at reduced speed from the motor.

4. In a surgical instrument, a handle for supporting a rotary cutting tool, adapted to be held in a surgeon's hand, comprising the combination of a substantially cylindrical shell form casing including a motor housing section, an electric motor mounted therein with its shaft in axial alignment with the axis of the shell, a shaft with a chuck in axial alignment with the motor-shaft and driven thereby at one end of the casing, and a gear-housing section at the other end detachably connected to the motor housing section, a dividing wall extending across the interior of the casing at the joint connecting said sections, said motor having a shaft extending through said dividing wall with a driving pinion located within the gear housing section, a large gear driven by said pinion and having a stub-shaft rotatably mounted in said dividing wall as a bearing, and having a rigid pinion on its side remote from the dividing wall at which the outer end of said shaft terminates, and a chuck shaft rotatably mounted coaxially in the gearing housing section and having a large gear driven by the last-named pinion.

J. VERNON LUCK.